(12) United States Patent
Kumagai et al.

(10) Patent No.: US 7,963,771 B2
(45) Date of Patent: Jun. 21, 2011

(54) EXPERIMENT AND EDUCATION SYSTEM EMPLOYING A PLURALITY OF UNITS

(75) Inventors: Takasi Kumagai, Tokyo (JP); Hideki Kumagai, Tokyo (JP)

(73) Assignee: Shinko Engineering Reseach Corp., Tokyo (JP)

( * ) Notice: Subject to any disclaimer, the term of this patent is extended or adjusted under 35 U.S.C. 154(b) by 511 days.

(21) Appl. No.: 11/906,806

(22) Filed: Oct. 4, 2007

(65) Prior Publication Data

US 2009/0092956 A1 Apr. 9, 2009

(51) Int. Cl.
*G09B 23/06* (2006.01)
(52) U.S. Cl. ........ 434/300; 434/301; 434/302; 434/303; 434/379; 434/429; 24/303; 446/92
(58) Field of Classification Search .................. 434/276, 434/283, 300, 301, 302, 303, 365, 367, 379, 434/380, 389, 401, 429; 24/303; 446/92
See application file for complete search history.

(56) References Cited

U.S. PATENT DOCUMENTS

| | | | | |
|---|---|---|---|---|
| 2,915,831 | A * | 12/1959 | Parker | 434/73 |
| 3,008,245 | A * | 11/1961 | Meuche | 434/224 |
| 3,077,696 | A * | 2/1963 | Barnett et al. | 446/92 |
| 3,748,755 | A * | 7/1973 | Karplus et al. | 434/301 |
| 4,825,526 | A * | 5/1989 | Shenier et al. | 24/303 |
| 6,449,167 | B1 * | 9/2002 | Seymour | 361/760 |
| 7,120,972 | B2 * | 10/2006 | O'Banion | 24/303 |
| 2004/0229489 | A1 * | 11/2004 | Lu | 439/214 |
| 2005/0012579 | A1 * | 1/2005 | Underwood et al. | 335/207 |
| 2008/0068816 | A1 * | 3/2008 | Han et al. | 361/760 |

FOREIGN PATENT DOCUMENTS

JP 6-8980 2/1994

* cited by examiner

*Primary Examiner* — Gene Kim
*Assistant Examiner* — Joseph B Baldori
(74) *Attorney, Agent, or Firm* — Jordan and Hamburg LLP

(57) ABSTRACT

When a mechanism constituent unit having a base is secured to a magnetic base at a predetermined position, a fixture having a detachable mechanism inside itself is employed, and the fixture is disposed on a notch of the base of the mechanism constituent unit in a non-adsorption state in which magnetic force lines of a permanent magnet of the detachable mechanism permeate the fixture. In this state, a rotation casing is rotated 90 degrees to be in a lock state, and a fixing casing is firmly adsorbed to the magnetic base such that magnetic force of the permanent magnet inside it permeate to the magnetic base side. Thus, the mechanism constituent unit base is firmly sandwiched by a pressing portion of the fixing casing and the magnetic base, and the base of the mechanism constituent unit is firmly secured to the magnetic base at a predetermined position.

16 Claims, 12 Drawing Sheets

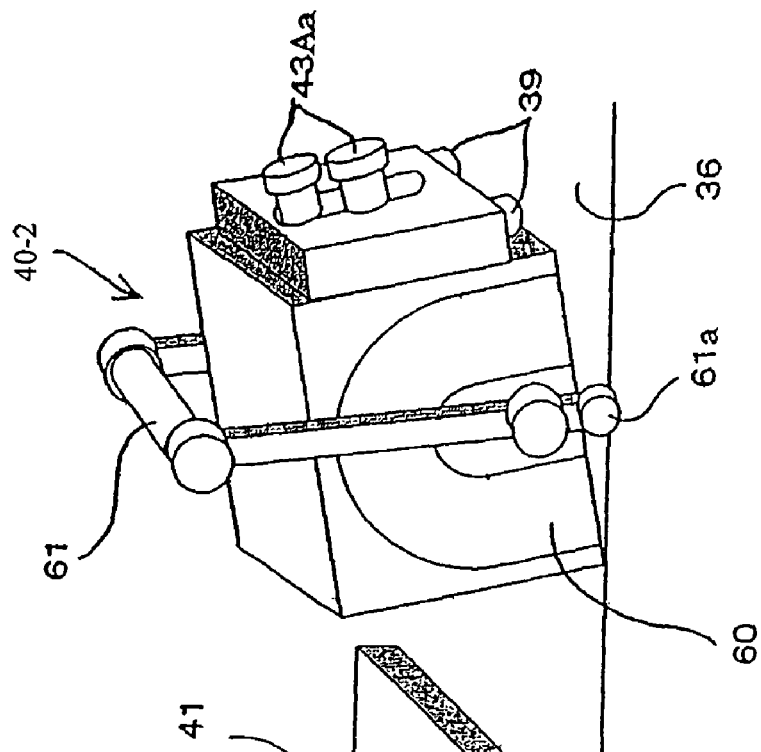
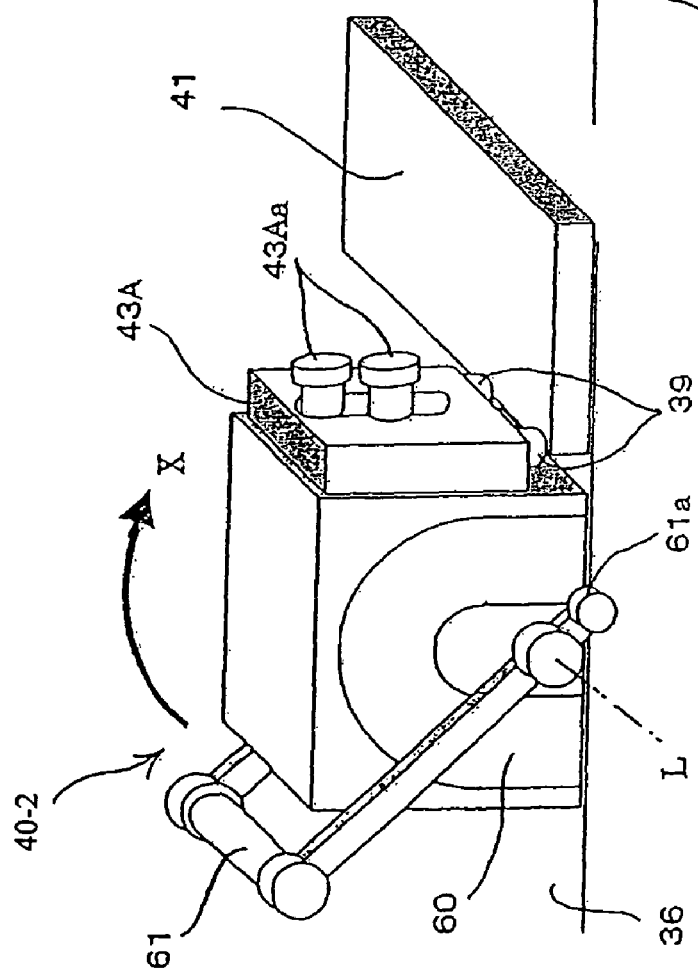
Fig. 8(A)
Fig. 8(B)

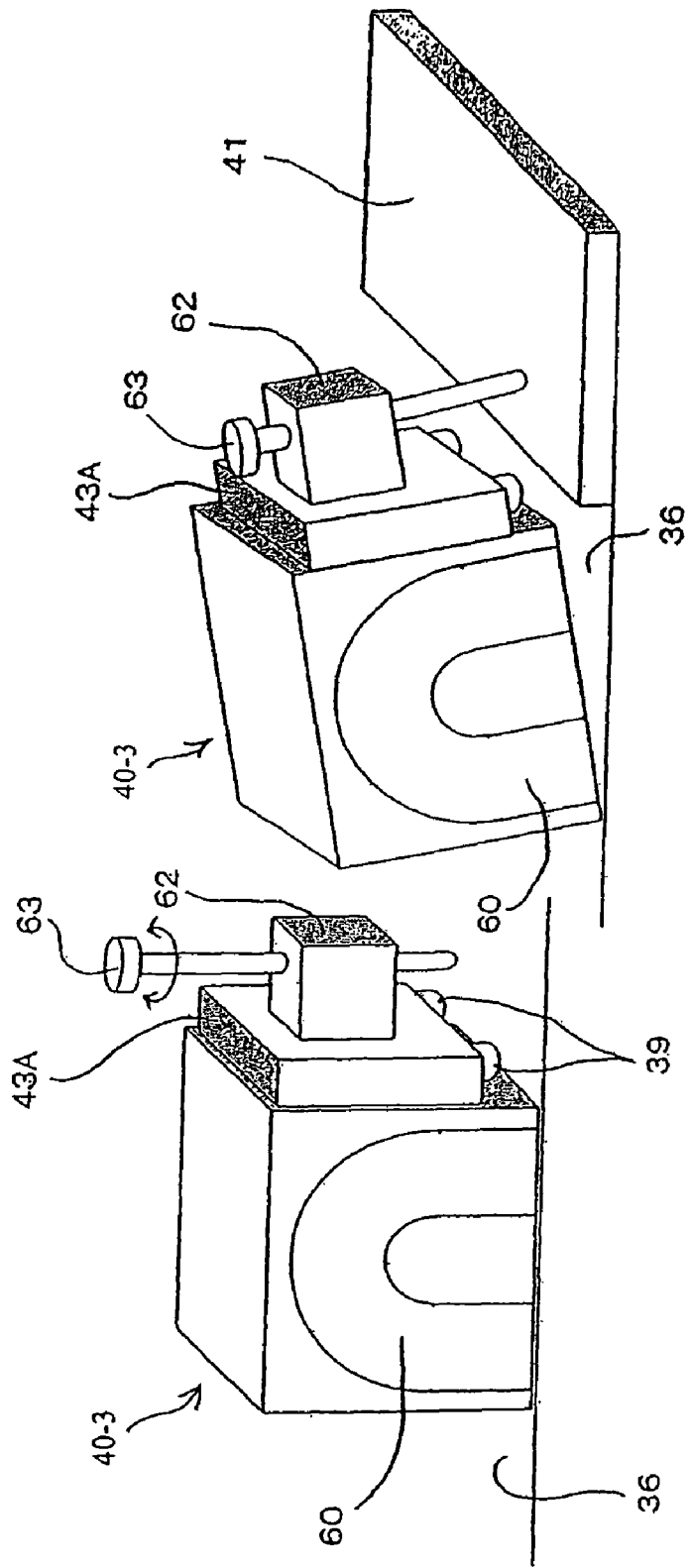

RELATED ART

EXPERIMENT AND EDUCATION SYSTEM EMPLOYING A PLURALITY OF UNITS

BACKGROUND OF THE INVENTION

1. Field of the Invention

The present invention relates to a system employing a fixture which detachably secures an object to a predetermined base material, and more particularly to a system in which device constituent elements such as various types of mechanism components, sensors and the like (hereinafter, including embodiments, referred to as "unit") are appropriately combined to construct a unit constituent body and perform experiment, research, education and the like of a function or the like of the unit constituent body.

2. Description of the Related Art

Considering an automated device as an example, the automated device needs a mechanism section constituting an output terminal portion which imparts an objective operation to an object, an operation (interlock) converting mechanism for driving the mechanism section, and a drive mechanism for driving the operation converting mechanism. The automated device also needs a control system which issues an operation command to the drive source and a sensor which supplies information such as an operational state and position of an object to the control system.

For designing the automated device, advanced technical knowledge is naturally required. Even if you have such knowledge, when respective types of units are assembled to enable examination of real operational state to be performed before a real device is constructed, a problem which could not be expected in an impractical state may be found, and an appropriate design may be made in which design and alternation may be made for more efficient configurations by altering combination of units. Further, such flexible combination of units is preferable also as an educational device for improving design technique of students or the like other than persons having technical knowledge described above.

The present inventors, considering the above-described circumstances, have proposed "Automated Mechanism Research Education Device" disclosed in Japanese Patent Application Publication No. 06-8980, and this device has widely utilized in various type of research facilities, and educational facilities such as universities and technical high schools to gain popularity.

In the invention described in the above Patent Document, a large number of various units constituting an automated device are prepared, and a device user (hereinafter referred to as "user" simply) such as designers and students appropriately select units which are suited for their own designs to assemble selected units so as to construct one mechanism integrally.

FIG. 12 shows an exemplary structure of a device proposed in the above document.

In the device having the structure illustrated, a large number of rails 10X arranged in an X direction perpendicular to rails 10Y arranged in a Y direction are arranged with respect to the rails 10Y, and each of the rails 10X is a direct attachment object with respect to each unit. That is, each unit selects a predetermined rail 10X to determine an attachment position in the Y direction, and identifies a predetermined position of a specified rail 10X in the longitudinal direction of the rail 10X to provide positioning in the X direction. Thus, positions in the X and Y directions are determined in each unit, and each unit is coupled to constitute a specific device (mechanism) integrally.

The structure, operational state and the like of the mechanism shown in FIG. 9 will be described below in order to explain usability of the present invention though it is nearly redundant.

The constructed system in FIG. 12 is one kind of synchronization drive system in which timing of a belt conveyer is matched to a feed screw of a motor drive. A belt conveyer main body 16a is secured to a base 16b of a unit, and the base 16b is fixed on an arbitrary position in the longitudinal direction of a rail 10X by a bolt 16c. All bolts securing other units are shown by reference character B below. The rails 10X on which respective units should be attached are selected in accordance with an arrangement state of the entire mechanism constituted by the respective units as described above, and the respective units are fixed on appropriate positions along the longitudinal direction of the selected rail 10X by employing the bolt B. The structure is made such that a bolt through portion of a base material is an oblong hole so that the position with respect to the Y direction is finely adjustment.

Respective units fixed on the respective rails 10X will be described. Reference numeral 17 denotes a reversible motor unit having a speed reducing mechanism which is one actuator unit, and reference numeral 18 denotes a perpendicular conversion feeding screw unit which is one type of mechanism unit for operation conversion and which is coupled with the reversible motor unit 17 having the speed reducing mechanism through a coupling 29.

Reference numeral 19 designates a translatory table type unit which is classified as one type of output terminal unit or operation converting mechanism unit, and is coupled with the perpendicular conversion feeding screw unit 18 through a rod 20. Reference numeral 21 designates a reflective photoelectric sensor unit which is one type of sensor unit. The unit 21 is arranged adjacent to the translatory table type unit 19 to thereby detect movement of a translatory table of the translatory table type unit to allow its positional signal to be displayed on a display screen (not shown) of a computer.

Reference numeral 22 designates an oil/air conversion cylinder unit which is one type of actuator, and reference numeral 23 denotes a one-way clutch unit which is an operation converting mechanism and which is coupled with the oil/air conversion cylinder unit 22 through a rod 24. The belt conveyer unit 16 is coupled with the one-way clutch unit 23. The units are respectively coupled with other units mechanically and signally to construct an integral machine system in one body, that is, a synchronization drive system of a belt conveyer. Because of the structure, when in the system, the oil/air conversion cylinder of the oil/air conversion cylinder unit 22 is driven by a signal of a photoelectric sensor of the photoelectric sensor unit 21, the belt conveyer of the belt conveyer unit 16 is driven for only one-way part every time.

Next, these units are coupled with a predetermined control circuit of a control panel 11 to cause the respective constituent units to perform predetermined operations. For example, it is constructed such that a user may construct a desired control system by connecting a predetermined line part of a plurality of relay terminals arranged or such that they are connected to an assembled relay circuit to control the mechanism based on a predetermined control order.

The reversible motor unit 17 having the speed reducing mechanism is operated by the operation signal of the control system constructed as describe above, and its driving force becomes linear motion in the perpendicular conversion feeding screw unit 18. In this case, by allowing the reversible motor unit 17 having the speed reducing mechanism to be connected to a timer 25, the reversible motor of the motor unit 17 undergoes a phase reversal at preset time to allow the feed screw of the same unit 18 to advance and retreat. The operation of the feed screw is transmitted to the translatory table of the translatory table type unit 19 through the rod 20 to allow the table to advance and retreat. The operation state of the table is detected by the reflective photoelectric sensor unit 21, and its positional signal is outputted to a computer or the like to be employed as a timing signal which drives the belt conveyer unit. Further, it is possible to additionally incorporate the timer 25 in the relay circuit to alter control by a method of controlling the circuit's ON/OFF.

The drive force of the oil/air conversion cylinder unit 22 is transmitted to the one-way clutch unit 23 through the rod 22 to provide intermittent operation, and by this intermittent operation, the belt conveyer of the belt conveyer unit 16 is intermittently operated.

As the exemplary structure and its operation state are specifically shown in the above, in the system which has been proposed in advance by the present inventors, a plurality of units for constituting the device are arranged and secured to desired positions, respectively, which makes it possible to freely construct a system in accordance with a predetermined object.

In the above device, when a desired mechanism is appropriately assembled and operated, the usability of the device will be improved further by allowing the following necessary conditions to be satisfied.

(1) The arrangement of each unit is appropriately performed.

If the arrangement of each unit is not appropriately performed, for example, loss may be generated in transmission of drive force from a drive unit to another unit, or if it is a translatory drive, a problem may occur such as a drift in the drive direction is generated. Further, in the case of the sensor unit, an operation state of another unit cannot be measured accurately if a sensing position is not appropriate, and consequently, timing of a signal becomes inappropriate.

(2) The arrangement of each mechanical constituent unit can be performed firmly.

In a drive unit and a unit which receives drive force from the drive unit to perform a predetermined operation, stress by which the entire unit is to move in a direction opposite to the drive direction by reaction force against the drive force is generated. That is, when each unit is not firmly secured, position of each unit may change in accordance with reaction force against the drive force, and the entire mechanism becomes in a so-called clattering state by vibration or the like due to repeated operations of the drive body such as a cam in which the axis of rotation is eccentric to cause an operation defect, so that the operation of an integral mechanism becomes impossible finally.

(3) Changes of arrangement positions of respective units can be made easily.

For example, in the case where the placement of a predetermined unit is reversed in the front or back direction, or depending on the circumstances in the case where a unit is exchanged with another unit, or in the case where the arrangement position of a unit is finely adjusted several times, it is necessary that attachment and detachment of a unit to and from an attachment object such as the rail 10X is easy. Here, that the attachment and detachment is easy means that operation of attachment and detachment is simple, that a special tool is not necessary for the operation, and that a large amount of force is not necessary. In short, it means that attachment/detachment and movement of a unit can be performed in a short period of time without necessitating a special skill, tool, and a large amount of force in the operation.

This point conflicts with the above-described requirement (2). The relationship of an antinomy is usually likely caused such that facility of attachment and detachment is deteriorated when a unit is firmly fixed and that firmness of securing is sacrificed when facility of attachment and detachment is improved. However, a great stride in usability as a device will be made if both properties are compatible with each other.

Considering the above-described prior arts from the above-described viewpoints, it is nearly perfect as a device in light of being capable of constituting almost all of desired mechanisms. But, since each mechanism is secured to a predetermined rail 10X by means of a bolt B as shown in FIG. 12, firm securing of respective units regarding the condition (2) can be easily cleared by screwing the bolt B tightly. However, a tool for screwing such as a screwdriver and an adjustable spanner is necessary for securing bolts, and it is necessary to repeat operation of loosening and screwing the bolts B every time fine positional adjustment is performed. For this reason, regarding (3) in which fine adjustment of arrangement of a unit should be performed easily, its achievement is difficult. Further, the manner in which the bolt through hole of each unit is an oblong hole extending in the Y direction for fine adjustment so as to perform the fine adjustment in the Y direction is also far from facility of the fine adjustment.

SUMMARY OF THE INVENTION

It is an object of the present invention to provide a research and education system by which a technical object that has not been achieved by the above prior arts can be achieved without damaging advantages and effects of the prior arts that the present inventors have previously proposed.

That is, according to one aspect of the present invention, there is provided an experiment and education system in which a plurality of units that are a mechanical element, an optical element, a measurement element such as a sensor, and the like, are combined to form a unit constituent body that is a machinery having a specific function in their entirety and also to implement experiment and education regarding the function of the unit constituent body. Respective units are constructed so as to be appropriately disposed on arbitrary positions on a magnetic base material, and the respective units are detachably secured to the base material on the arbitrary positions by means of fixtures which employ magnetic force, so that the units are secured to the base material so as to be mutually adjusted in position to thereby constitute the unit constituent body.

For example, a magnetic flat plate made of a ferrous metal is employed as a base material for arranging units, and units having predetermined functions are arranged on the base material to form a unit constituent body as a machinery having a specific object in their entirety. In this case, the respective units are secured to the base material on predetermined positions by employing fixtures which are detachably adsorbed to the base material by magnetic force. Thus the respective units are fixed in such a way that positional adjustment thereof is possible to form a unit constituent body that is a desired machinery. Consequently, experiment and research regarding the function of the unit constituent body are conducted, and research regarding change or the like in function and properties of the entire unit constituent body is done, for example, by changing a predetermined unit into another unit.

BRIEF DESCRIPTION OF THE DRAWINGS

FIG. 1 shows perspective views of a detachable mechanism, wherein

FIG. 4 shows cross-sectional views of the fixture shown in FIG. 3, wherein

FIG. 6 shows a fixture accommodating the detachable mechanism shown in FIG. 5, wherein

FIG. 8 shows perspective views of a fixture showing a third embodiment, wherein FIG. 8A shows a state in which the fixture is adsorbed to a base material, and FIG. 8B shows a state in which the fixture is spaced apart from the base material by using a lever;

FIG. 9 shows perspective views of a fixture showing a forth embodiment, wherein FIG. 9A shows a state in which the fixture is adsorbed to a base material, and FIG. 9B shows a state in which the fixture is spaced apart from the base material by using a screw;

FIG. 10 shows states in which mechanism constituent units are fixed by employing the fixture shown in FIG. 6, wherein

DETAILED DESCRIPTION OF THE INVENTION

First Embodiment

An embodiment of the present invention will be specifically described below with reference to the drawings.

FIGS. 1 to 4 show the structure of a fixture of a unit according to a first embodiment of the present invention.

Figure 1A:
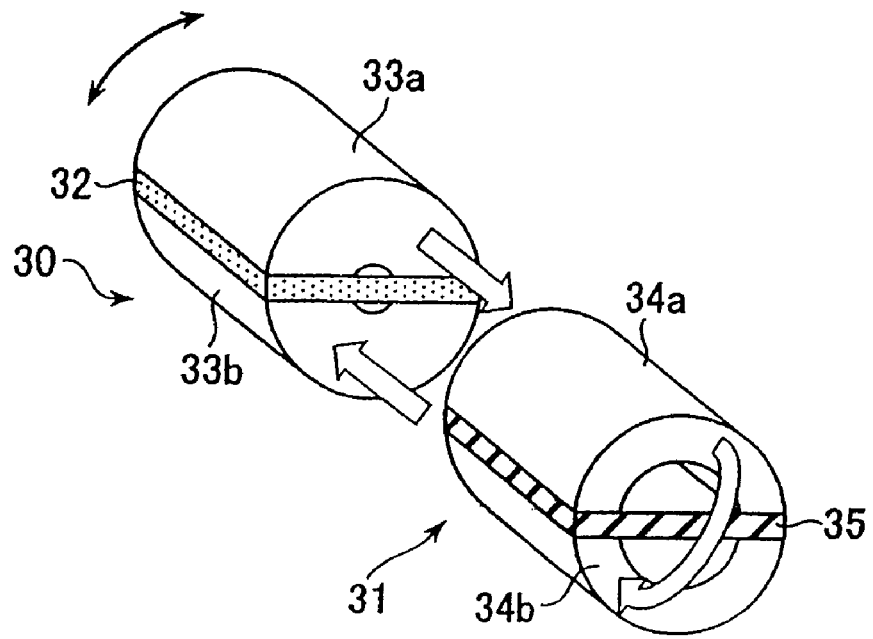
FIG. 1A shows an adsorbable state with respect to an object.
Figure 1B:
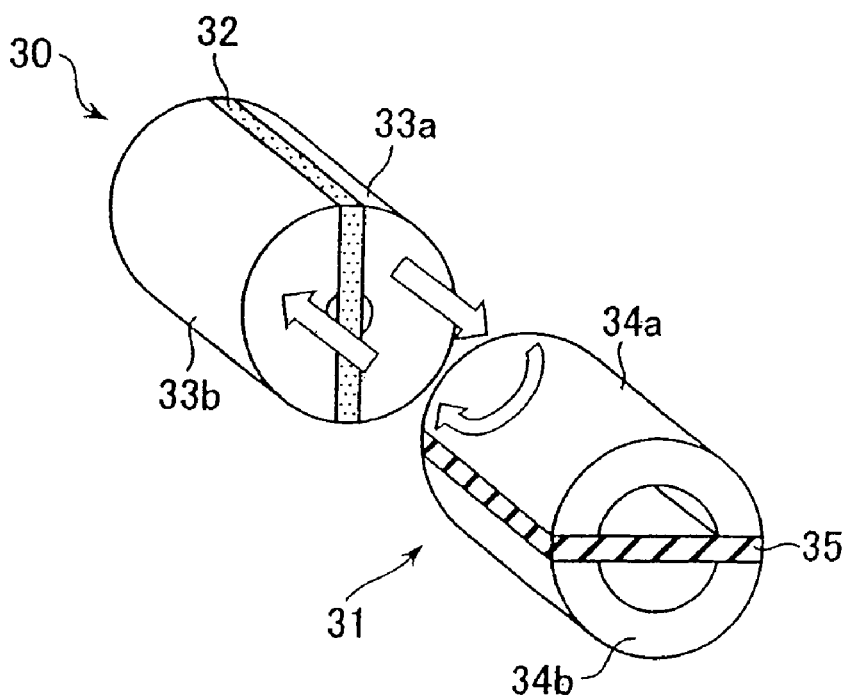
FIG. 1B is a view showing a detachable state with respect to the object.
Figure 2:
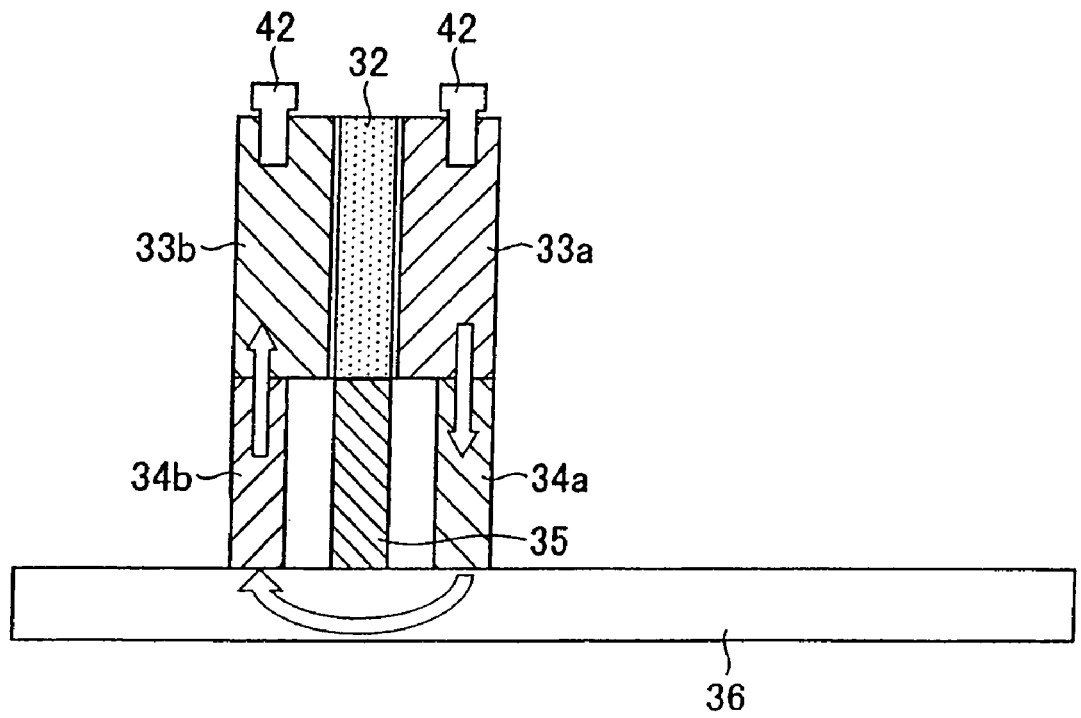
FIG. 2 is a cross-sectional view of the detachable mechanism showing a permeation state of magnetic force lines in a state in which the detachable mechanism shown in FIG. 1 is adsorbed to a base material.

FIGS. 1 and 2 are views showing in principle the structure of a fixture's detachable mechanism to be accommodated in the fixture according to the first embodiment.

The detachable mechanism employs a permanent magnet, and as described later, a permeation state of magnetic force lines of the permanent magnet is controlled so that the mechanism is attached to and detached from a base material that is an adsorption object. The detachable mechanism is composed of two blocks 30 and 31 as apparent from the drawings, and both the blocks 30, 31 are constructed such that they can relatively rotate about their axial center. In the following description, the case where the block 30 is rotated is exemplified and explained. In the illustrated structure, the blocks 30, 31 are all formed cylindrically.

First, the structure of the block 30 will be described. Reference numeral 32 is a permanent magnet formed into a plate shape, which is constructed as a magnet having a strong force of the extent that the entire fixture can be firmly adsorbed and secured to the base material. To the permanent magnet 32, block constituent bodies 33a, 33b made of a magnetism permeable material are arranged and fixed so as to sandwiching the permanent magnet 32 therebetween, to thereby integrally construct the cylindrical first block 30 in their entirety. The permanent magnet 32 is arranged inside the block 30 such that respective poles are positioned at both end surfaces of the cylindrical first block 30.

Next, the second block 31 is composed of block constituent bodies 34a, 34b having permeability which is similar to that of the first block 30 and a spacer 35 sandwiched by these block constituent bodies 34a, 34b. The second block 31 is constructed so as to be cylindrical, having substantially the same structure as that of the first block 30 in outward form. However, the spacer 35 is a non-magnetic material which is different from the permanent magnet 32. Accordingly, the spacer will be called a non-magnetic spacer.

One end surface of the above-described first block 30 and one end surface of the second block 31 are arranged in intimate contact with each other in a state in which the first block 30 can rotate about its axial center. Thus, as shown in FIG. 1A, when end surfaces of the respective block constituent bodies 33a, 33b of the first block and end surfaces of the respective block constituent bodies 34a, 34b of the second block are in a state in intimate contact with one another integrally, these respective block constituent bodies become one body to construct one magnetism permeable path. Consequently, magnetic force lines of the permanent magnet 32 permeate a base material 36 that is the fixing object as shown in FIG. 2. That is, when the respective blocks 30, 31 are in a state of FIG. 1A, the detachable mechanism composed of the blocks 30, 31 are firmly adsorbed to the base material 36.

Meanwhile, as shown in FIG. 1B, when the first block 30 in the state of FIG. 1A is rotated 90 degrees, the integration of the block constituent bodies in the blocks 30, 31 is cancelled. As a result of this, magnetic force lines of the permanent magnet 32 permeate only in the block constituent bodies 33a, 33b of the first block and the constituent bodies 34a, 34b of the second block, and do not reach the bottom end of the second block 31 that is the adsorption surface. As a result, the adsorption force with respect to the base material 36 is not generated on the adsorption surface (one end surface of the second block in the illustrated side in the structure of FIG. 1) of the detachable mechanism that is an end surface of the second block. That is, only allowing the first block 30 and the second block 31 to rotate 90 degrees about its axial center, permeation of magnetic force lines of the permanent magnet 32 can be controlled, and consequently, the fixture body incorporating the detachable mechanism can be quite easily attached to and detached from the base material. Incidentally, while magnetic force lines of the permanent magnet 32 can be controlled when the first block 30 and the second block 31 are relatively rotated 90 degrees, allowing the second block 31 firmly adsorbed to the base material 36 to rotate is hardly actualized. For this reason, it is realistic to control magnetic force lines on the adsorption surface of the second block by rotating the first block 30.

Figure 3:
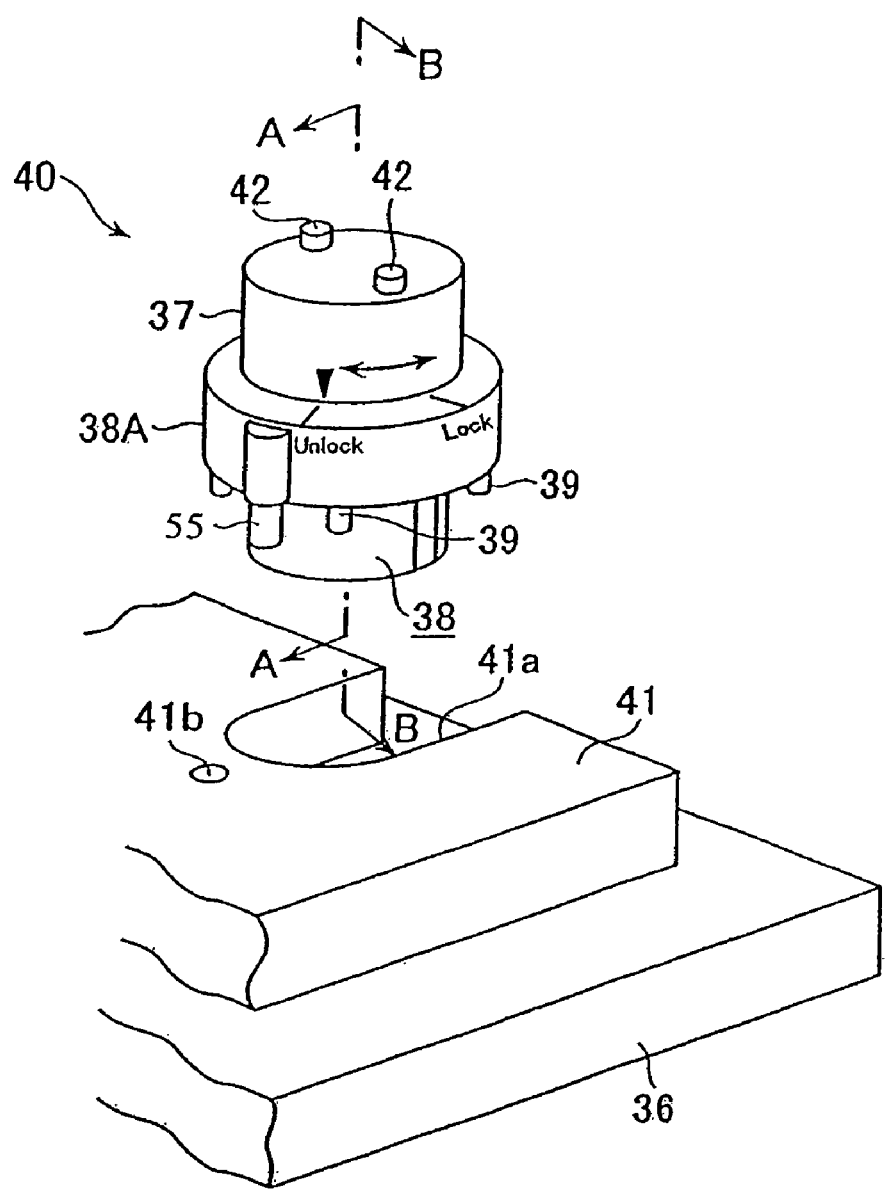
FIG. 3 is a perspective view of a fixture showing a state of securing a fixture of a first embodiment to the base material.

FIGS. 3 and 4 illustrate a fixture constructed to incorporate an adsorption mechanism shown in FIGS. 1 and 2.

Reference numeral 40 denotes this fixture, reference numeral 37 denotes a rotation casing, and reference numeral 38 denotes a fixing casing. The rotation casing 37 is constructed so as to be rotatable with respect to the fixing casing 38. A pressing portion 38A protruding like a flange is formed on the outer periphery of the upper part of the fixing casing 38. In the pressing portion 38A, a plurality of members for preventing slip (hereinafter referred to as "slip preventing members") 39 made of a flexible material such as rubber are embedded in the circumferential direction of the bottom surface of the pressing portion 38A toward the fixing object which will be described later herein.

Inside the rotation casing 37, a permanent magnet 32 having a plate-like configuration similar to that shown in FIGS. 1 and 2 and the block constituent bodies 33a, 33b are arranged and fixed such that the block constituent bodies 33a, 33b sandwich the permanent magnet 32. That is, the first block 30 shown in FIGS. 1 and 2 is secured inside the rotation casing 37, and the first block 30 is constructed to rotate together with the rotation casing 37.

The second block 31 composed of the non-magnetic spacer 35 sandwiched by the block constituent bodies 34a, 34b is formed, arranged, and fixed inside this casing. Although in FIG. 3, pins 42 protrude from the top portion of the rotation casing 37 as grips for rotating the rotation casing 37, these pins 42 are omitted in FIG. 4.

Figure 4A:
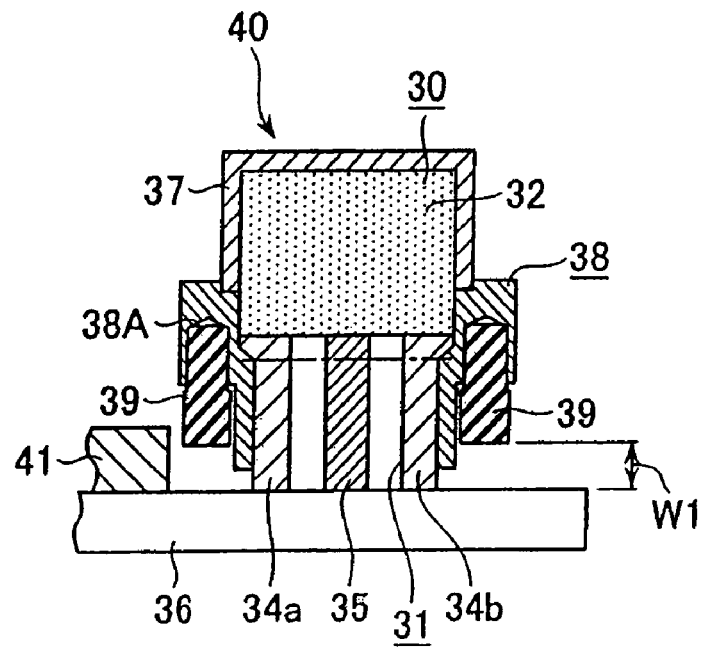
FIG. 4A is a cross-sectional view taken along line A-A of FIG. 3.

Regarding the structure above, the permanent magnet 32 of the first block 30 and the non-magnetic spacer 35 of the second block 31 are perpendicular to each other in FIG. 4A, and as illustrated, the block constituent bodies 33a, 33b of the first block and the block constituent bodies 34a, 34b of the second block inside the fixing casing 38 are not integrated. Accordingly, magnetic force lines of the permanent magnet 32 do not reach the bottom end of the fixing block 31 side, and consequently, the fixture is not adsorbed to the base material 36 to be in a freely movable state.

In FIG. 3, reference numeral 41 denotes a base of a mechanism constituent unit, and respective mechanisms are fixedly secured to the base 41. A notch 41a for mounting each fixture 40 is formed on the base 41 of each unit. When the base 41 of the present mechanism constituent unit is arranged on a predetermined position of the base material 36, the fixing casing 38 of the fixture 40 is positioned at this notch. In this state, the slip preventing members 39 provided on the pressing portion 38A protruding from the outer periphery of the fixing casing 38 abut the surface of the base 41.

Figure 4B:
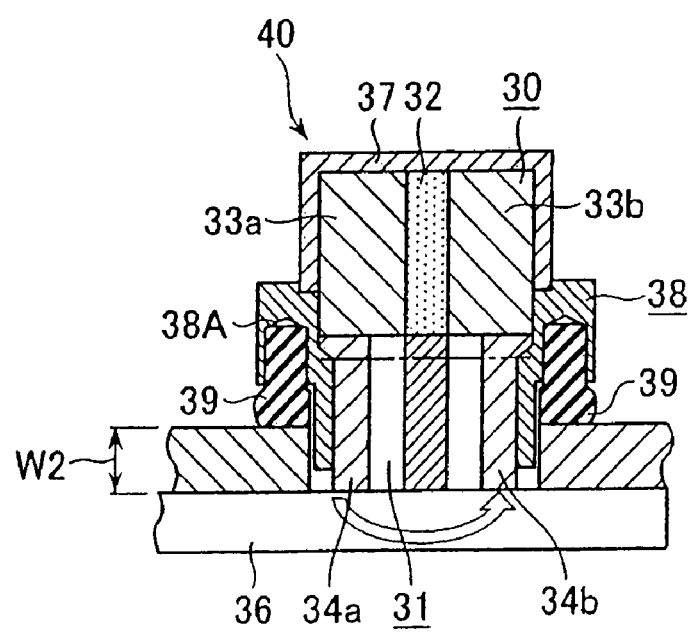
FIG. 4B is a cross-sectional view taken along line B-B of FIG. 3.

When the base 41 is arranged at a correct position on the base material 36, the rotation casing 37 of the fixture 40 arranged on the notch 41a is rotated 90 degrees in a lock direction. Thus, as shown in FIG. 4B, the block constituent bodies 33a, 33b of the first block 30 and the block constituent bodies 34a, 34b of the second block 31 are integrated, and magnetic force of the permanent magnet 32 permeates the base material 36, so that the fixture 40 is firmly adsorbed to the base material 36. In this case, since clearance W1 between the bottom end portion of the slip preventing members 39 of the fixture 40 and the base material 36 is set at a value smaller than thickness W2 of the base 40, the fixture 40 is firmly adsorbed to the base material 36, so that the slip preventing members 39 are deformed for canceling this difference to be pressed against the base 41 as shown in FIG. 4B. More specifically, the fixture 40 itself is firmly and fixedly secured to the base material 36, and the base 41 is firmly secured to a predetermined position by the fixture 40 through the slip preventing members 39. In the case where the fine adjustment of the position of the base 41 is performed, the fixed state is completely released by allowing once the rotation casing 37 to rotate 90 degrees to an unlock side. Therefore, in this state, the arrangement position of the base 41 is finely adjusted, and after the fine adjustment is finished, the rotation casing 37 is rotated to the lock side again to firmly fixing the base.

In the structure of FIG. 3, a pin 55 protrudes from the fixture 40, and a pin through hole 41b into which the pin 55 is inserted and positioned is formed on the base 41. When the fixture 40 is arranged, the pin 55 is inserted into the pin through hole 41b so as to make the operation of the fixture 40 easy.

Since the fixing casing 38 side is firmly and fixedly secured to the base material 36 with the base 41 fixed by the fixture 40, the rotation casing 37 in an upper part can readily be rotated to be in the unlock state. However, in the case where the fixture 40 is arranged on the notch and the rotation casing 37 is rotated from the unlock state to the lock state, the fixing casing 38 is not adsorbed to the base material 36 when the rotation of the rotation casing 37 is started, which may cause the fixing casing 38 to be rotated in synchronization with the rotation casing 37 or may change the position of the entire fixture 40. For this reason, consideration is necessary for a user wherein the fixing casing 38 is firmly fixed by one hand and in this state the rotation casing 37 is carefully rotated. In this case, when the pin 55 meshes with the pin through hole 41b, the rotation casing 37 is rotated by one hand regardless of whether it is in the lock state or the unlock state, so that the fixture 40 can be easily attached and detached.

Second Embodiment

Figure 5:
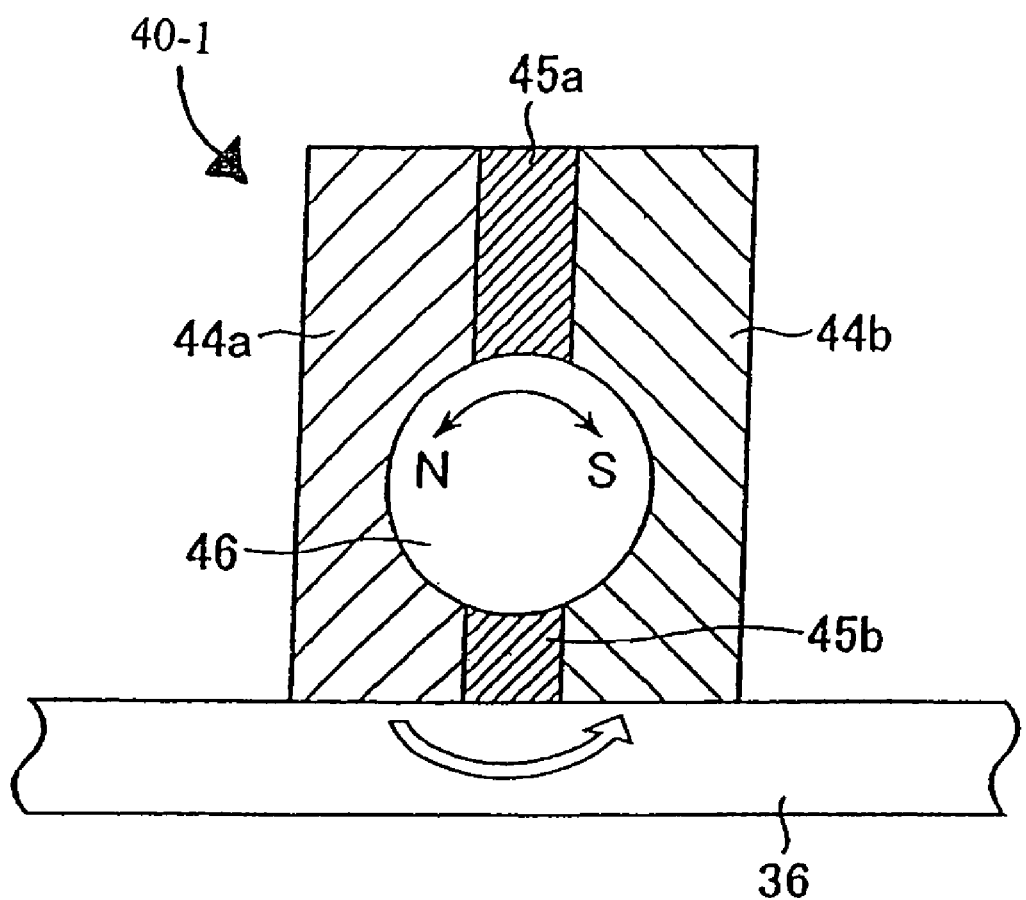
FIG. 5 is a cross-sectional view of a detachable mechanism showing a second embodiment.

FIGS. 5 and 6 illustrate a fixture 40-1 according to a second embodiment of the present invention.

FIG. 5 shows a constituting state of a detachable mechanism to be accommodated in the fixture 40-1, wherein reference characters 44a, 44b designate block constituent bodies made of a magnetism permeable material, and reference characters 45a, 45b designate non-magnetic spacers sandwiched by these block constituent bodies 44a, 44b. Reference numeral 46 designates a permanent magnet, which is formed into a cylindrical shape having an axial center in the direction perpendicular to the drawing. Respective poles are formed in the diametrical direction of the cylindrical shape, and the permanent magnet 46 can rotate about the axial center inside this block.

In the state of FIG. 5, the poles of the permanent magnet 46 are positioned to face the respective block constituent bodies 44a, 44b, and as a result, magnetic force lines of the permanent magnet 46 permeate the block constituent bodies 44a, 44b through the base material 36. That is, when the poles of the permanent magnet 46 are positioned horizontally as illustrated, the detachable mechanism is firmly adsorbed and secured to the base material 36. Further, when the respective poles are positioned in the non-magnetic spacer side by allowing the permanent magnet 46 to rotate 90 degrees from this state, the magnetic force lines do not escape from the block constituent bodies 44a, 44b, so that the adsorption force of the detachable mechanism is lost.

Figure 6A:
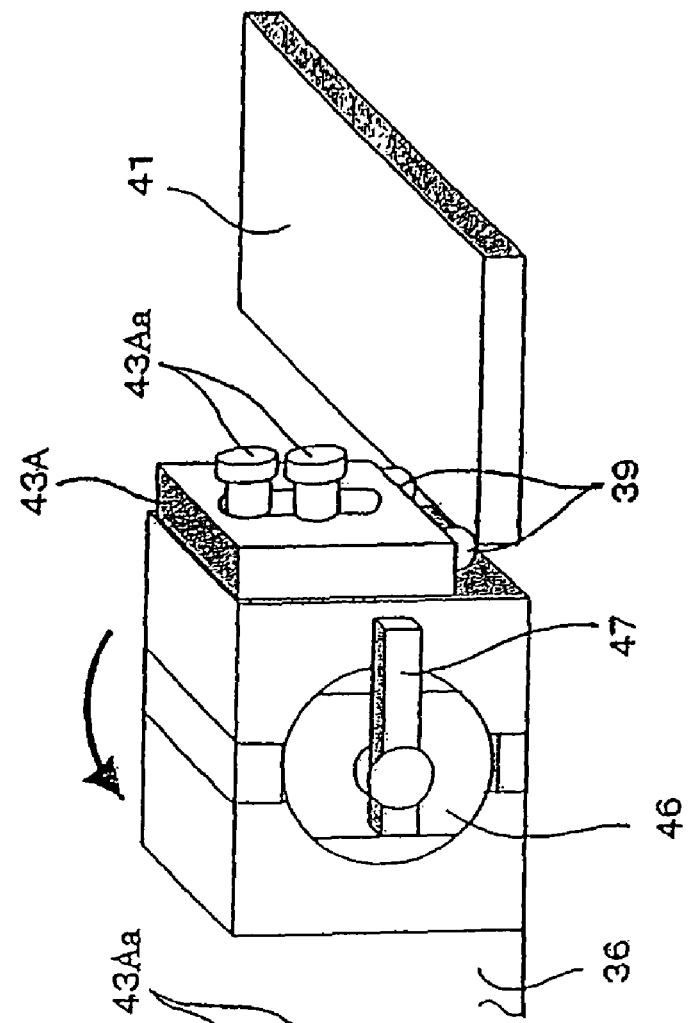
FIG. 6A is a side view of the fixture.
Figure 6B:
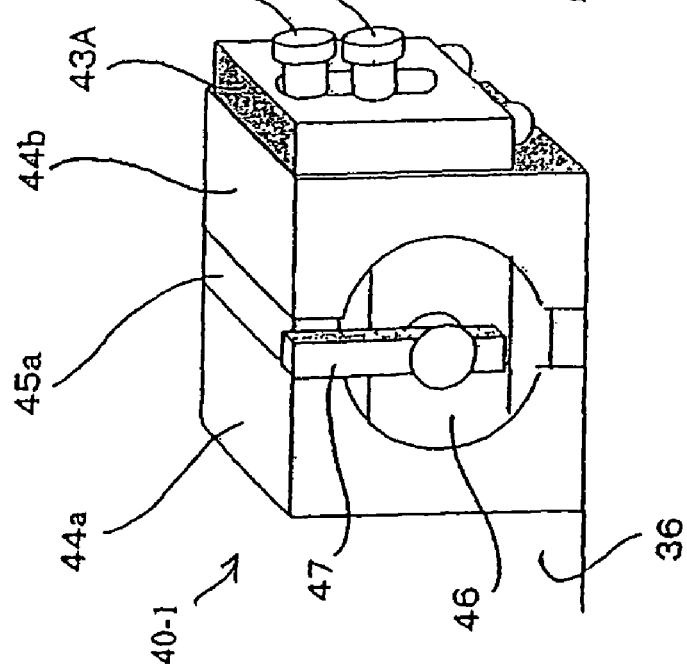
FIG. 6B is a front view thereof.

The fixture 40-1 of FIGS. 6A and 6B shows a fixture constructed based on the above-described structure. Reference numeral 47 denotes a lever for allowing the permanent magnet 46 forming a part of this fixture 40-1 to rotate. By operating the lever 47, the poles of the permanent magnet 46 are altered 90 degrees to attach and detach the fixture 40-1 to and from the base material 36 as shown in FIG. 5.

Reference character 43A designates pressing portions protruding from a side wall portion of the fixture main body 44a formed into a substantially rectangular. These pressing portions 43A are fixedly secured to the fixture main body 44a in such a manner that positional adjustment in the vertical direction is possible by means of a screw 43Aa. Slip preventing members 39 protrude from the pressing portion 43Aa toward a fixing object, similarly to the fixture 40.

Figure 7A:
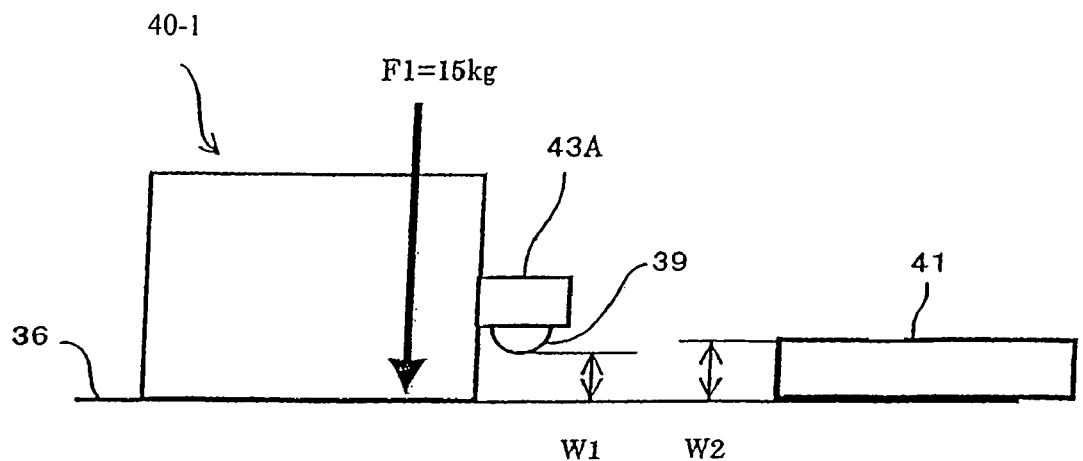
FIGS. 7A and 7B are views schematically illustrating states in which a base of a unit is fixed by a fixture.
Figure 7B:
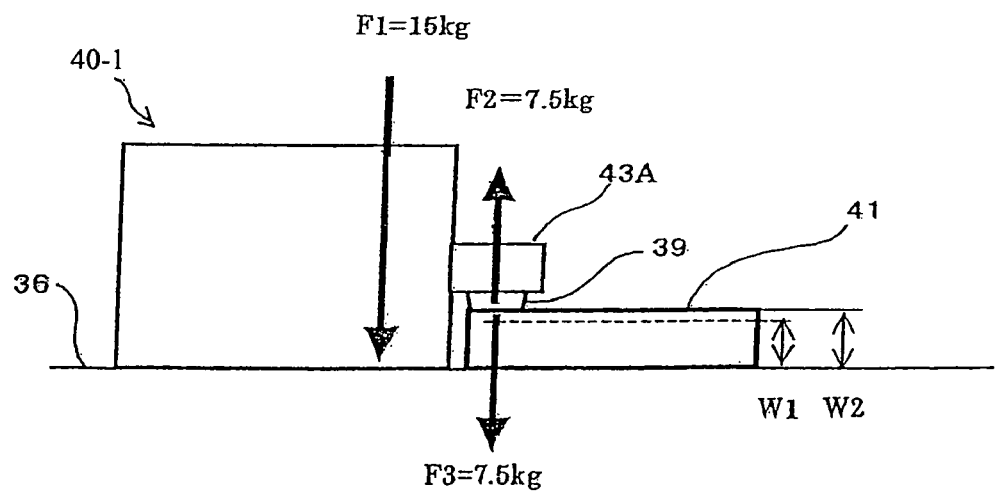

Here, functions (properties) of the slip preventing members 39 will be described in detail with reference to FIG. 7 as follows. FIG. 7 schematically shows the structure of the fixture.

That is, assume that adsorption force F1 by the magnetic force of the fixture 40-1 is 15 kg. In the case where space W1 between the slip preventing members 39 and the base material 36 is 9 mm at the time of non-adsorption and width W2 of the base 41 of a unit is 10 mm, it is correct to set under an ideal condition that pressure reaction F2=7.5 kg and that pressing force F3=7.5 kg with respect to the base 41 that is a fixing object.

More specifically, in the above case, spring constant of the slip preventing members 39, K=7.5 kg/Lmm. In this state, if there is a deviation of ±0.1 mm in the thickness W2 of the base 41 that is a fixing object, the pressure reaction F2=7.5 kg±0.75 kg, and similarly the pressing force F3 becomes 7.5 kg±0.75 kg also (see FIG. 7B).

Accordingly, in any case, there is a possibility that either the fixture 40-1 or the base 41 that is a fixing object floats at 6.75 kg. But, in many cases, this is sufficient enough for fixing of a unit in an ordinary education. The above is description of the adsorption force of one fixture, and when a unit constituent body is formed, one or more fixtures is/are employed for each unit, so that a desired fixing strength can be obtained easily.

Third Embodiment

FIG. 8 shows a fixture according to a third embodiment.

Magnetic force lines of a magnet are controlled to attach or detach a fixture to and from the base material 36 in any of the above-described embodiments. In any of the embodiments and a forth embodiment which will be described later herein, a fixture is separated from the base material 36 forcibly by physical force against adsorption force of a magnet.

A permanent magnet (horseshoe-shaped magnet in the case of the drawing) 60 is accommodated in the fixture 40-2, and the fixture 40-2 is adsorbed to the base material 36 by the permanent magnet 60. Reference numeral 61 denotes a lever, which is configured to rotate about a rotation axial center L thereof. Further, the distance from a bottom end 61a of the lever 61 to the rotation axial center L is set to a value longer than the distance from the rotation axial center L to the base material 36. As a consequence, when the fixture 43 is adsorbed to the base material 36 by the magnetic force of the permanent magnet 60, the lever 61 is positioned at a tilt angle as shown in FIG. 8A.

When in this state the lever 60 is rotated in the X direction, the entire fixture 40-2 floats against the adsorption force of the permanent magnet 60 by the rotation of the bottom end of the lever 61 in which the rotation arm length is set to a length longer than the distance from the rotation axial center L to the base material 36, so that the fixed state of the base 41 is released. In this connection, since the adsorption force by the magnetic force is inversely proportional to the second power of the distance, the adsorption force of the entire fixture 40-2 decreases drastically only by separating the fixture 40-2 from the base material 36 a little. For example, when the adsorption force F1 of the permanent magnet 60 is 15 kg which is same as that of the former example, the entire fixture 40-2 is separated from the base material 36 in the order of 1 to 2 mm, so that the fixture 40-2 can be easily removed from the base material 36.

Fourth Embodiment

This embodiment is an embodiment which can be said to be a modified example of the third embodiment.

More specifically, in the fourth embodiment, means for spacing the fixture 40-3 apart from the base material 36 is formed directly on the pressing portion 43A instead of the lever 61. Or, a screw (male thread) screwing a female thread portion 62 (illustrated structure) protruding from the pressing portion 43A is rotated so that the fixture 36 can be fixedly secured (the state of FIG. 9A) or can be spaced apart (the state of FIG. 9B).

Figure 10A:
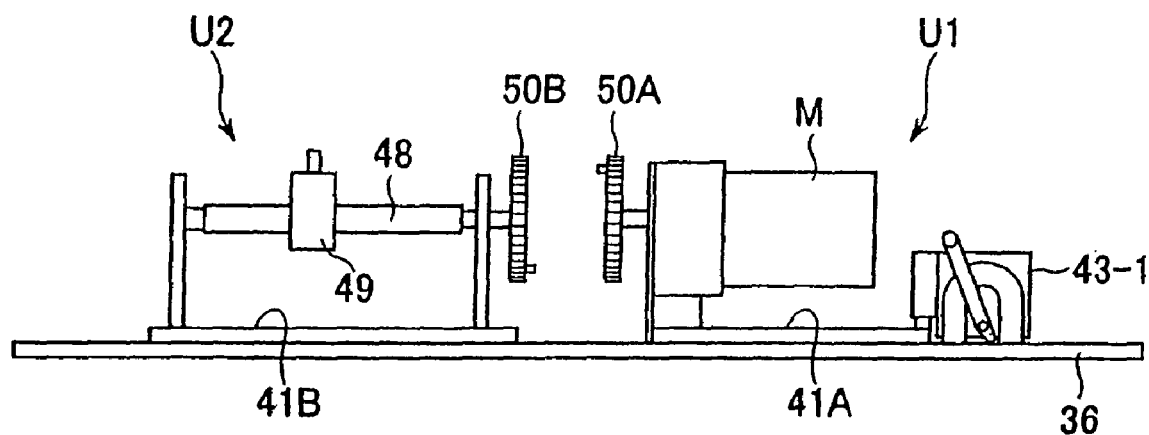
FIG. 10A shows a side view of a unit of a stage where the unit is being fixed.
Figure 10B:
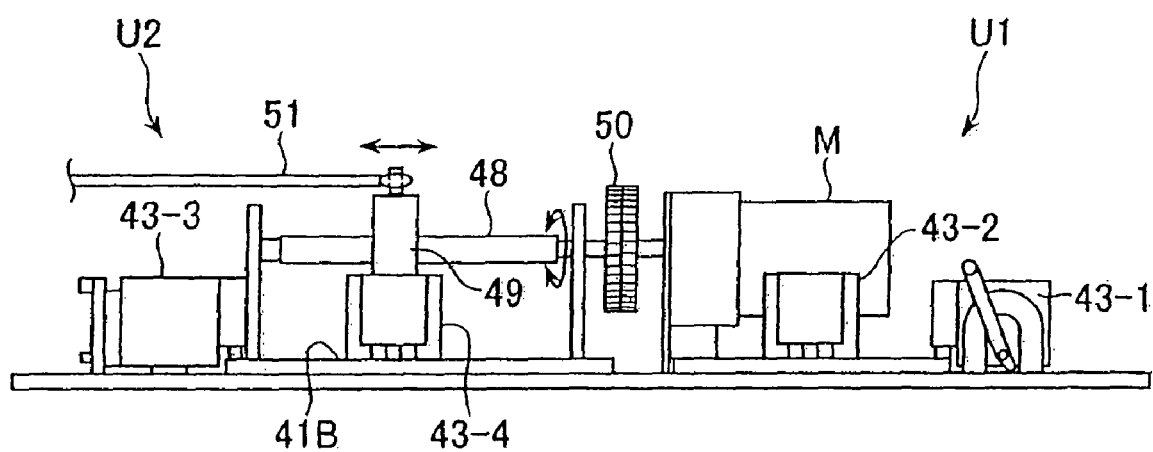
FIG. 10B shows a side view of the unit in a state in which fixing of each unit is completed.

FIGS. 10A and 10B illustrate a state in which a plurality of mechanism constituent units are coupled by employing the fixture 40-1 of the second embodiment.

In the drawings, reference character U1 designates an actuator unit which supplies drive force to another unit. A geared motor M for generating the drive force is fixed on a base 41A, and a coupling member 50A constituting a part of a coupling mechanism 50 is provided on the geared motor M.

Reference character U2 designates a mechanism unit, which is constructed so as to perform a predetermined operation by employing the drive force supplied from the actuator unit U1. The illustrated structure includes a coupling member 50B, a screw rod 48 to be coupled with the coupling member 50B, and a slider 49 which screws the screw rod 48.

Next, setting of these units will be described. First, the actuator unit U1 is arranged on a predetermined position of the base material 36. When the arrangement position is appropriate, the pressing portion 43b is positioned on an end edge portion of the base 41A of the actuator unit U1 with a first fixture 40-1 (hereinafter designated by reference numeral 43-1) unlocked (in a state in which the lever 47 is positioned in Y side in FIG. 6A), so that, in this state, the lever 47 is rotated in the X direction. Thus, the fixture 43-1 is firmly adsorbed and fixed to the base material 36 side to secure the base 41A of the actuator unit U1 to the base material 36. In this case, when there is a possibility that the position of the actuator unit U1 itself is changed by reaction force of the rotational force of the geared motor N due to the single-handed fixture 43-1, a next fixture 43-2 is arranged on another position on the base 41A to more firmly fix the base 41A. During this operation, if the necessity of fine adjustment for the position of the actuator unit U1 arises, fine adjustment can be performed extremely easily by operating lock and unlock of the fixture by means of the lever operation of each fixture, which is similar to the case of the above-described embodiments.

After the setting of the actuator unit U1 is completed, the mechanism unit U2 is arranged on an appropriate position such that the coupling member 50 of the mechanism unit U2 is correctly coupled with the coupling member 50A of the actuator unit U1. In this state, the base 41B of the mechanism unit U2 is fixed on the base material 36 by means of a fixture 43-3 through an operation similar to the fixing case of the actuator unit U1. Further, similarly to the actuator unit U2, in a case where firm fixing is necessary furthermore, fixing is performed by employing a next fixture 43-4 or the like as the need arises.

After the coupling configuration of the actuator unit U1 and the mechanism unit U2 is completed, a connecting rod 51 is coupled with the slider 49 of the mechanism unit U2. In this structure, the rotation drive force from the actuator unit U1 is conveyed to the screw rod 48 of the mechanism unit U2 through the coupling mechanism 50. The rotation of the screw rod 48 allows the slider 49 which screws the screw rod 48 to displace to the axial center direction of the screw rod 48. This displacement is conveyed, for example, to another mechanism unit as a linear motion through the connecting rod 51. In this case, the reaction force (counter torque) against the rotation torque of the geared motor M of the actuator unit U1, the reaction force of the linear motion with respect to another unit through the connecting rod 15, and the like are added to the respective units U1, U2. These units try to displace in the direction opposite to the reaction force. In particular, when the pitch of the screw rod 48 is made small to set a movement amount of the slider 49 at an amount smaller than the rotational speed of the screw rod 48, strong pressing force or pulling force operates in the mechanism unit U2 through the connecting rod 51. Since even in this case, the respective fixtures 43-1, 43-2, 43-3 and 43-4 allow the bases 41 of the respective units to be firmly secured to the base material 36 as described above, the constituted mechanism correctly operates for a long period of time.

Figure 11A:
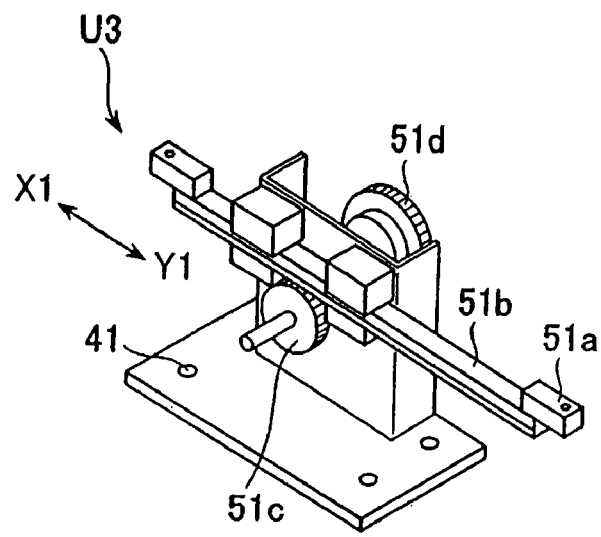
FIGS. 11A, 11B and 11C are perspective views of respective units showing examples of fixing objects.
Figure 11B:
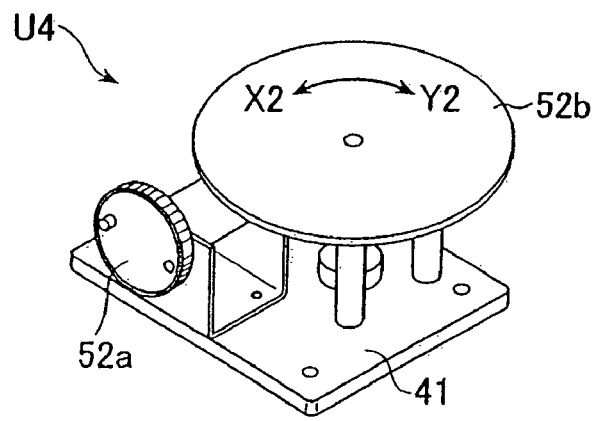
Figure 11C:
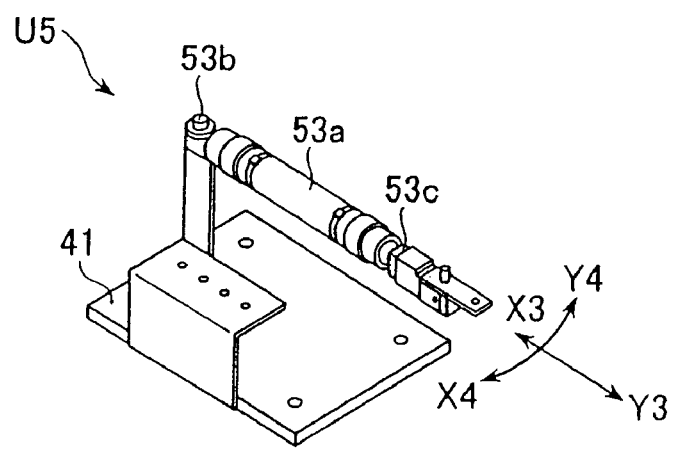
Figure 12:
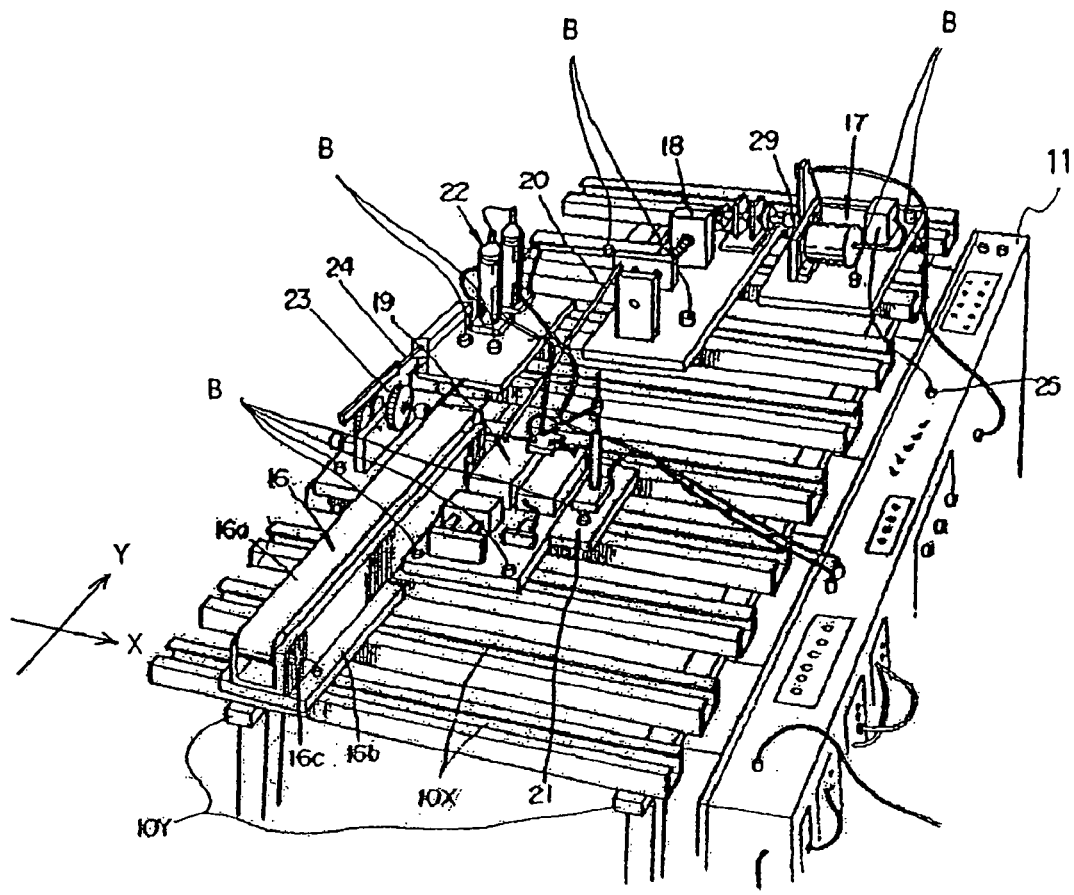
FIG. 12 is a perspective view showing an exemplary structure of an automated mechanism research education device that the present inventors have previously proposed.

FIG. 11 illustrates an example of another mechanism constituent unit.

The unit designated by arrow U3 in FIG. 11A is one type of mechanism unit, and linear motion in the X1-Y1 direction from an actuator unit performing reciprocating motion is conveyed to a rack 51*b* through a joint 51*a*. This linear motion is conveyed to a pinion 51*c* which meshes with the rack 51*b* as rotational motion, and is conveyed to another unit through an output gear 51*d* coupled with a pinion 51*c* as rotational motion. In this case, reaction force of linear motion in the X1-Y1 direction, counter torque with respect to rotation torque of the output gear 51*d*, or the like operates as a force for displacing the base 41.

In FIG. 11B, a unit designated by reference character U4 is one type of mechanism unit, which receives drive force outputted from another unit by an input gear 52*a*, and allows rotational force of the input gear 52*a* to be conveyed to a turn table 52*b* by a rotation axis changing mechanism such as, for example, a bevel gear. In this case, if an object is placed on an eccentric position of the turn table 52*b*, vibration for vibrating the axial center of the turn table 52*b* is generated in the unit U4 when the turn table 52*b* rotates in an X2 or Y2 direction, and the vibration operates as a force for displacing the base 41 of the unit U4.

In FIG. 1C, a unit designated by reference character U5 is one type of actuator unit, wherein reference character 53*a* denotes an air cylinder, which is constructed so as to be rotatable about a hinge 53*b* in an X4-Y4 direction. A rod 53*c* expands and contracts in an X3-Y3 direction in the air cylinder 53*a* itself. Therefore, when the air cylinder 53*a* is operated, reaction force of the expansion and contraction operation of the cylinder rod 53*c* in the X3-Y3 direction functions as a force for displacing the base 41 in either direction between the X4-Y4 direction. In particular, in the case of the unit U5, operation direction of the air cylinder 53*a* can be changed freely between the X4-Y4 direction, and thus, reaction force at the time of mechanism operation becomes also unspecified. For this reason, fixing of a unit is not fixing in a specified direction, and it is necessary that fixing is firm enough to cope with the reaction force in any direction.

As should be apparent also from the operation state of the unit illustrated in FIG. 11, in the respective units, unique reaction force corresponding to their operational properties is generated in entire unit, and the reaction force operates as a force for displacing the base constituting a unit from a specific position on the base material. As should be obvious from the description above, the fixture according to the present invention can fix the base of a unit firmly in any direction uniformly.

In the system according to the present invention, each unit for constituting a unit constituent body that is a device for achieving a specific objective can be detachably secured easily to a base material by means of a fixture employing magnet. With this construction, each unit can be fixed on a desired position of a base material easily and firmly while its positional adjustment is possible, and it is also possible to easily perform adjustment, experiment, education, and the like of the structure of the device as the unit constituent body.

Further, magnetic force lines of a magnet having strong magnetic force and attached to a fixture is controlled for example by a lever operation, or rotation operation of a rotation portion, or on/off operation of a power source in the case of an electromagnet. Alternatively, instead of controlling magnetic force lines, principle of lever, rotation operation of screw, or the like is used to forcibly space the fixture apart from the base material. This makes it possible to easily attach and detach the fixture to and from the base material without using a special tool and requiring a strong force. Consequently, the position of a fixing object can also be finely adjusted with ease.

Further, by allowing an elastic material, such as rubber, which has a high frictional resistance and which is elastically deformed to lie and be arranged on the pressing portion of a fixture, the fixing object is firmly sandwiched by the pressing portion of the fixture and the base material to which the fixture main body has been adsorbed by magnetic force. Thus, the fixing object is firmly fixed on a predetermined position of the base material, so that each unit can sufficiently maintain a predetermined mechanism against the reaction force of a drive force, vibration or the like, without so-called backlash, for a long period of time.

For the fixture according to the present invention, arranging and fixing the mechanism constituent unit is exemplified in an automated mechanism research education device. However, it can be utilized in all devices in which a desired member or device has to be arranged firmly on a predetermined position on a placement surface which faces the base material 36 and which has permeability.

What is claimed is:

1. An experiment and education kit comprising a plurality of units having functional elements, the functional elements comprising a mechanical function element, an optical function element, a detection and measurement function element, or a drive function element, the units being connectable, interlockable or mutually couplable to form a unit constituent body that is an apparatus having a specific function, the kit further comprising a magnetic base and fixtures employing magnetic forces to securedly engage the units against the magnetic base, the fixtures being arranged, when the kit is assembled, alongside sides of the units and comprising peripheral side pressing portions including elongate, elastic slip preventing members protruding from the fixture interiors to the peripheral side pressing portions, the slip preventing members being embedded within an interior of a respective fixture when assembled and are arranged, when the kit is assembled, above a respective top surface of the units and deform across an entirety of a cross-sectional surface area thereof upon being pressed against the top surface of a unit so as to sandwich the units between the slip preventing members and the magnetic base upon secured engagement of the units to the magnetic base, wherein at least two of the units are constructed so as to be detachably secured at arbitrary positions on the magnetic base by means of the fixtures so that the unit constituent body is constructable by mutual positional adjustment of the units detachably secured on the magnetic base.

2. The experiment and education kit according to claim 1, wherein the peripheral side pressing portions are provided on the fixtures so that the units are sandwiched and fixed by the magnetic base and the pressing portions through magnetic force of the fixtures with respect to the magnetic base.

3. The experiment and education kit according to claim 2, wherein the slip preventing members are made of an elastic material.

4. The experiment and education kit according to claim 2 or 3, wherein the position of the pressing portions can be adjusted in a pressing direction toward the magnetic base in response to the difference in the size of a portion of a fixing member of the unit that is pressed by a respective pressing portion.

5. The experiment and education kit according to claim 3, wherein a fixing member for the fixture is formed and provided in at least two of the units such that a dimension of the fixing member portion that is pressed by a respective pressing portion of a fixture is constant in response to the pressing force applied thereagainst.

6. The experiment and education kit according to claim 5, wherein the fixing member of at least one unit also serves as a base of the unit, and a mechanism constituent member that is the function element of the unit is provided on the base of the unit.

7. The experiment and education kit according to claim 5, wherein a portion formed into a hole or notch is formed in the fixing member for disposing the fixture on the fixing member of at least one unit, and at least part of the fixture is disposed and accommodated in the portion for disposing the fixture so that the fixture does not disturb fixing of another unit.

8. The experiment and education kit according to claim 5, wherein the fixing member includes an engagement portion which engages with a protrusion or a recess formed on the fixture is provided so that a positional change of the fixture is prevented when fixing the unit is performed.

9. The experiment and education kit according to claim 5, wherein the slip preventing member allows the fixture to be fixed and secured to the magnetic base, and when the fixing member of the unit is pressed and fixed through the slip preventing member, force distribution is set such that a reduction effect of the magnetic force of the fixture itself with respect to the magnetic base due to reaction force of elastic deformation of the slip preventing member received from the fixing member of the unit and the pressing force with respect to the fixture member of the unit by the elastic deformation pressure are both not insufficiently weak.

10. The experiment and education kit according to claim 9, wherein an elasticity coefficient of the slip preventing member is conditionally set such that reduction effect of the magnetic force of the fixture itself with respect to the magnetic base and the pressing force with respect to the fixture member of the unit are both not insufficiently weak with respect to variations in the size of pressing objects of the fixture member of the unit.

11. The experiment and education kit according to claim 5, wherein the fixing member portion is a plate and the dimension is a thickness thereof.

12. The experiment and education kit according to claim 1, wherein a detachable mechanism by operation of a single permanent magnet is provided in the fixture, and by the detachable mechanism, the path of magnetic force lines of the permanent magnet is controlled so that the fixture is attached to or detached from the magnetic base.

13. The experiment and education kit according to claim 12, wherein the detachable mechanism includes magnetism conveying members that are attached to both magnetic poles of the permanent magnet respectively to form one group of blocks, and the magnetism conveying members are formed so as to be able to contact and slide on another group of blocks having a similar structure so that the path of magnetic force lines of the permanent magnet can be controlled by driving the blocks.

14. The experiment and education kit according to claim 1, wherein the fixture is provided with a permanent magnet which allows the fixture to be fixed to the magnetic base and separation means for separating the fixture from the magnetic base against the magnetic force of the permanent magnet, so that the fixture is fixed to or detached from the magnetic base by the permanent magnet and separation means, respectively.

15. The experiment and education kit according to claim 14, wherein a mechanism capable of increasing the amount of the separation force is provided as the separation means.

16. The experiment and education kit according to claim 15, wherein the mechanism comprises a screw or a lever.

* * * * *